Feb. 9, 1960  H. W. HUMPHRES  2,924,096
CAVITY VOLUME MEASURING INSTRUMENTS
Filed March 9, 1955  2 Sheets-Sheet 1
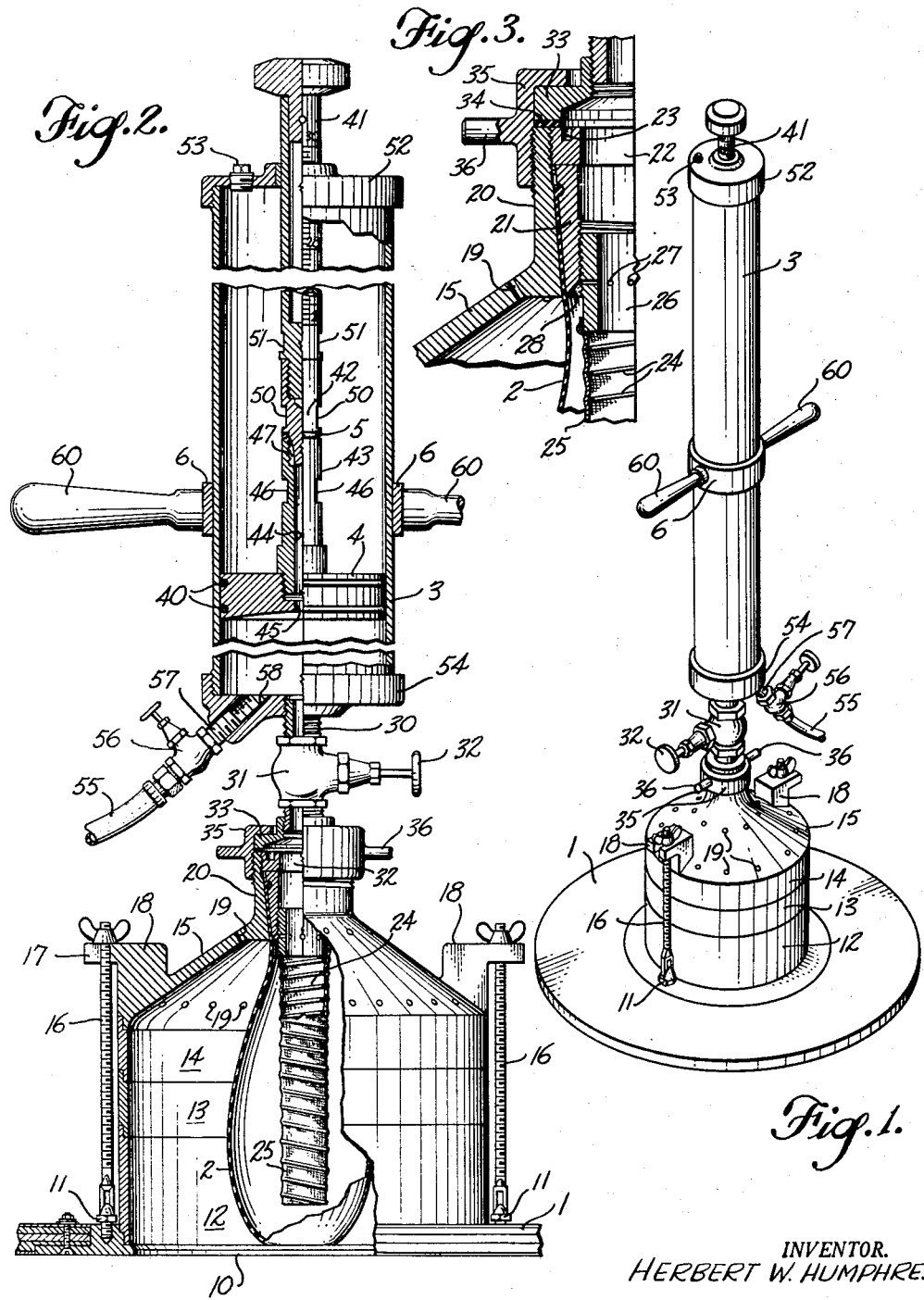
INVENTOR.
HERBERT W. HUMPHRES
BY
Reynolds, Beach & Christensen
ATTORNEYS Feb. 9, 1960 H. W. HUMPHRES 2,924,096
CAVITY VOLUME MEASURING INSTRUMENTS
Filed March 9, 1955 2 Sheets-Sheet 2

INVENTOR.
HERBERT W. HUMPHRES
BY
Reynolds, Beach & Christensen
ATTORNEYS

United States Patent Office 2,924,096
Patented Feb. 9, 1960

2,924,096
CAVITY VOLUME MEASURING INSTRUMENTS
Herbert William Humphres, Olympia, Wash.

Application March 9, 1955, Serial No. 493,163

12 Claims. (Cl. 73—149)

The present invention relates to an instrument for measuring the volume of a cavity and particularly such a cavity which is of irregular shape such as a test cavity in the ground surface, which information is utilized in the determination of soil density.

Frequently it is desirable to determine what load soil at a particular location is able to carry without excessive compaction or settlement for the purpose of determining whether such soil is suitable as a foundation for a road or an airplane landing strip, or for carrying the weight of a building. An important consideration in a determination of soil suitability for such purposes is the density of the soil. In determining such density it is also important that such density be of the undisturbed soil.

A customary way of determining soil density is to excavate a cavity in the ground surface, to weigh the soil removed from the cavity and to divide such weight by the volume of the cavity. The volume of the cavity cannot be determined accurately by measuring the volume of the soil removed because such soil may either be looser or packed more firmly than before it was disturbed. Also such soil may be in lumps or chunks. The problem, therefore, is to measure accurately the volume of the cavity rather than the volume of the soil removed from the cavity. The function of the present instrument is to measure quickly and accurately the volume of such a soil cavity which usually is of irregular shape.

An object of the present invention is to provide an instrument having a member which will fill accurately a cavity such as in the ground surface, and which will fill such cavity completely irrespective of irregularities in the sides or bottom of the cavity.

A further object is to provide such an instrument which can be operated with facility in being used to determine the size of a cavity, yet which will enable the cavity size to be indicated directly or by the simple addition of a constant to an indicated value. Moreover, the volume will be thus indicated with great accuracy.

Still a further object is to provide such an instrument which is reasonably compact, of simple construction, and the accuracy of which will remain unaffected even after the instrument has been subjected to rough usage.

Additional objects and advantages will be pointed out in the following detailed description of a preferred form of the measuring instrument shown in the accompanying drawings.

In essence, the volume measuring instrument includes an inflatable bag or balloon, preferably of stretchable membrane material which can be distended to fill first a casing defining an index volume, which casing preferably is sectional, and which on a second operation can be distended to fill the cavity the volume of which is to be measured. Associated with such bag is a suction connection of a non-collapsible structure which is in communication with the cylinder in which a piston may be reciprocated by manual movement of a graduated piston rod. A valve in the connection between the inflatable bag and the cylinder may be closed to interrupt such connection, and preferably an independent supply and drain conduit is connected to the same end of the cylinder as the connection to the inflatable bag.

Figure 1 is a top perspective view of the measuring instrument, and Figure 2 is a side elevation view of such instrument with parts broken away.

Figure 3 is a vertical sectional view through a portion of the instrument on an enlarged scale.

Figure 4:
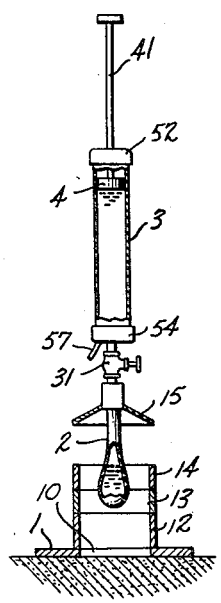
Figures 4, 5, 6 and 7 are diagrammatic side elevational views of the instrument with parts broken away, showing the parts in various operative positions during the calibration operation.

Generally the technique of measuring the volume of a cavity such as in the ground surface for which the present measuring instrument is adapted is to distend an inflatable bag or balloon within an index casing, and then to distend the inflatable bag to fill the cavity the volume of which is to be measured, and that portion of such casing as remains after a section or sections of the casing approximately equal to the volume of the cavity have been removed. The bag is inflated by positive displacement of its parts with substantially incompressible liquid, and such liquid is supplied to the bag from a measuring cylinder serving as the source of liquid supply. The measuring instrument after being set up in condition to be operated for a measuring operation is self-contained and is manually operable. To facilitate transportation its major components may be disassembled quickly so that it can be stored compactly.

The measuring instrument is mounted on a base ring 1 having a wide planar flange adapted to rest on the surface of the ground or other surface at the location of the cavity the volume of which is to be measured. This ring has a central aperture 10 of a size approximately that of the cavity mouth. The ring may be of integral construction, preferably of metal, or, as shown at the bottom of Figure 2, may be of composite structure including a central metal ring of generally angle cross section to which is secured a wide ring of plywood. In either case the ring is provided with anchor members such as bolts 11 located at opposite sides of the ring adjacent to its aperture 10.

The edge of the aperture 10 in ring 1 is formed for interfitting engagement with the lower edge of an index casing body which preferably is sectional, being composed of a plurality of index rings, such as 12, 13 and 14, and a cover 15. The meeting edges of such cover, rings and base aperture are formed to interfit, such as being shouldered so that the interfitting edges in each case form the same type of shouldered lap joint. Because of such construction any or all of the index rings 12, 13 and 14 can be omitted from the index casing, or any number of such rings may be assembled with the cover and base in any order to constitute an index casing of desired size. Moreover, it will be evident that the rings such as 12, 13 and 14 may be of equal or of different widths, and a variety of rings may be provided from which desired rings may be selected in any particular instance to provide an index casing of desired size.

When the desired index rings for a calibrating or volume measuring operation have been selected, these are secured together with the base 1 and cover 15 by tie rods 16 at opposite sides of the ring assembly, which are pivotally secured to the anchor members 11. Preferably such tie rods are in the form of bolts which may be swung laterally into notches 17 formed respectively in the opposite ears 18 on the cover. Wing nuts or other suitable securing means may be provided to tension the tie rods 16 between the anchor bolts 11 and the ears 18 for the purpose of securing the base, index rings and cover together as a unit. Holes 19 are provided in the cover to enable air to escape from it at all times.

The inflatable bag or balloon 2 is carried by the cover 15 of the index casing and is received within such casing. Such bag preferably is made of stretchable membrane such as rubber or neoprene, although it might be made of relatively inelastic material such as a plastic, a rubberized fabric, or similar sheet material which is impervious to the fluid with which the bag is to be filled. The neck of the bag will be suspended from the cover of the index casing in a manner which will enable liquid to be supplied to and withdrawn from the bag while it is thus suspended by its neck. Satisfactory bag suspension structure is shown most clearly in Figure 3. Preferably the top 15 has a neck 20 extending upward from its central portion, and it is also preferred that the top itself be of frustoconical shape, truncated at the junction with the neck 20. The opening through the neck 20 is shown as being tapered downwardly complementally to the taper of a clamping tube 21 which fits within the index casing neck.

The neck 20 is threaded both internally and externally at its top. With such internal thread may be engaged the retainer ring 22, which can be screwed into the internal threads by insertion of wrench prongs into sockets 23 in the ring. The inflatable bag is secured in place by placing the tube 21 within the neck of the bag, then lowering the bag through the neck 20 of the cover 15 until the external taper of the tube seats on the internal taper of the neck. The follower ring 22 may then be screwed into place to wedge the tube 21 downward for clamping the neck of the bag tightly between the tube 21 and neck 20.

With the bag 2 thus suspended from the cover 15 it is necesary to make provision for supplying inflating liquid to the interior of the bag and withdrawing such liquid from the bag. While the bag need not be emptied completely of the liquid, it should be possible to withdraw most of the liquid from the bag. For this purpose a flexible suction tube is extended through the bag so as to enable liquid to be withdrawn from virtually the entire length of the bag. Such tube may be composed of a wire frame 24 which may take the form of a helix, as shown, which is covered by flexible mesh material 25 such as open mesh cloth. This flexible suction tube is suspended from a rigid tubular attachment fitting 26 which is threaded externally and screwed into internal threads at the lower end of clamping tube 21. In order to avoid trapping of air in the extreme upper end of the cover 15, the rigid portion 26 of the suction tube has apertures 27 in its externally threaded portion which, when the tube is screwed into the clamping tube 21, will communicate with the recess formed by the chamfered surface 28 at the extreme lower end of the clamping tube 21.

The suction tube 24, 25, 26 communicates through the neck 20 with a liquid reservoir in the form of cylinder 3. This cylinder is detachably connectible to the cover 15 by a tube 30 in which a shut-off valve 31 is located, which may be operated by the valve handle 32 to close communication between the reservoir in cylinder 3 and the suction tube 24, 25, 26. The lower end of the tube 30 carries a flange fitting 33 which can be secured to the neck 20 of the index casing. To afford a liquid-tight seal between such flange and the casing neck, a gasket 34 is placed between these parts, and they are clamped together by a clamping ring 35, which has a radial flange overlapping the flange 33 of tube 30 and a circumferential flange threaded internally which can be engaged with the external threads on neck 20. Rotation of the clamping ring may be facilitated by providing the projections 36 extending from opposite sides of the ring, which can be gripped or struck at least to complete the tightening operation or to initiate the loosening rotation of the ring.

Within the cylinder 3 is a piston 4 slidable lengthwise of the cylinder and having a sealing fit with the internal walls of the cylinder. Leakage between the piston and cylinder may be prevented by providing sealing rings on the piston such as the rings 40 received in annular grooves of the piston, which may be of suitable leather, rubber or plastic material. Movement of this piston can be effected manually by reciprocation of a calibrated piston rod 41 extending through the end of the cylinder 3 opposite that to which the tube 30 is connected. If desired, this piston rod can be connected directly or even secured rigidly to the piston 4, but preferably it is connected to such piston by one or more short sections of rod. Two such sections are shown in Figure 2, designated 42 and 43.

It will be noted that rod section 43 has an axial bore 44 extending through it which communicates with an aperture 45 in the center of piston 4 when the rod extension 43 is secured to the piston, such as by the threaded connection shown. Interconnection of the rod extension 43 and the piston 4 is facilitated by providing two flattened portions 46 on opposite sides of the rod extension which may be gripped by a wrench with ease when screwing the lower end of the rod extension to the piston. The rod extension 42 has an externally threaded tip portion adapted to screw into an internally threaded socket at the end of the rod part 43 remote from the piston 4. The externally threaded tip of rod portion 42 has in it grooves 47 extending axially from its end to the base of the external thread, which grooves communicate with the bore 44 through rod portion 43, so that fluid may pass through the piston aperture 45, the axial pasage 44 in rod extension 43, and through grooves 47 into the cylinder interior.

When the measuring instrument is ready for use, the passage 44, 45, 47 is sealed by the upper end of the extension 43 abutting tightly against the lower end of extension 42 to prevent liquid from by-passing the piston 4. For this purpose a resilient gasket or sealing ring 5 may be interposed between the socket in the end of rod extension 43 remote from piston 4 and the portion of the piston rod secured in such socket. In the illustration shown in Figure 2 the gasket 5 will be engaged by the lower end of the rod extension 42. This rod extension may be screwed tightly into the socket of rod extension 43 to engage the gasket 5 firmly by fitting wrenches to the flattened portions 46 of the rod extension 43 and to the flattened side portions 50 on opposite sides of rod extension 42. The end of this rod extension remote from rod extension 43 has an internally threaded socket into which the externally threaded tip of the graduated piston rod portion 41 may be screwed. This piston rod portion also has flattened portions 51 at opposite sides to be gripped by a wrench for tightening this piston rod part relative to the rod extension part 42 or part 43.

The piston rod part 41 is of a length to extend upward through the end of cylinder 3 remote from the end connected to the suction tube 24, 25, 26. This end of the cylinder is closed by a cylinder head 52 which may be threadedly connected to the cylinder end and has a central aperture through which the piston rod member 41 projects. A port closed by plug 53 enables this end of the cylinder to be vented when the piston is to be moved to prevent compressing air or forming a vacuum in such cylinder end. The opposite end of the cylinder is closed by the cylinder head 54, which also may be screwed onto the cylindrical wall of the cylinder. This cylinder head had an internally threaded central aperture into which the connecting tube 30 can be screwed. In addition, this end of the cylinder has a connection through which liquid may be supplied, such as the hose 55. This hose is connected to the control valve 56 which is supported from the cylinder head 54 by the nipple 57 screwed into an internally threaded aperture 58 in such cylinder head.

During transportation of the volume measuring instrument to the location to which it is to be used, the cylinder 3 can be disassembled from the index casing cover 15 and the index casing itself disassembled. Alternatively, merely the index casing may be transported in disassembled condition, and the cylinder, index casing top and inflatable bag 2 may be transported and handled in assembled relationship, preferably with the bag enclosed in a suitable protective casing. To facilitate handling the cylinder 3 and such parts, a band 6 may be secured about the cylinder, which band carries oppositely projecting handles 60 which may be gripped easily for lifting and turning the cylinder. When the cylinder has been assembled on the index casing, however, as illustrated in Figure 1, the instrument should have reasonable stability because of the considerable width of the flat, ground-engaging ring 1.

In assembling the measuring instrument for use initially, the cylinder 3 will be assembled on the cylinder head 54, the piston 4 will be inserted in the cylinder with the piston rod extension 43 attached to it, and the cylinder head 52 will be secured to the other end of the cylinder. The further piston rod member 41 and, if desired, member 42 will also be screwed into place on the rod extension 43, while leaving the connection between its socket and the rod tip inserted in it sufficiently loose to allow air to escape from bore 44 through grooves 47. The liquid supply nipple 57 and valve 56 may then be attached to the cylinder head 54, and the connecting tube 30 with its valve 31 and flange 33 may be screwed onto the cylinder head 54.

Either before or after the measuring instrument has been transported to the location where it is to be used, the cover 15 and inflatable bag 2 are assembled and attached to the connecting tube 30. If the neck of the bag 2 has a bead on it, as shown in Fig. 3, an annular groove may be provided in the exterior of clamping tube 21 or the interior of neck 20, or in both of these parts. In the illustration of Figure 3 such a groove is provided only in the clamping tube 21. The flexible suction tube 24, 25, 26 will be threadedly secured to the clamping tube 21, and then these tubes will be inserted within the bag 2. The bag and suction tube will then be inserted through the neck 20 of the cover 15 until the neck of the bag is clamped between tube 21 and the neck 20 of the cover and secured in place by the follower ring 22.

Next the gasket 34 is placed within the ring 35 fitted over the flange 33 of the connecting tube, and such ring is then screwed onto the upper end of the index casing cover 20. The index casing cover 15 may now be placed on the index casing or other suitable casing. Assuming that the cover is placed on an index casing composed of the base ring 1 and index rings 12, 13 and 14 as shown in Figure 2, the cylinder and bag assembly may be secured to the index casing by swinging tie rods 16 upward into their notches 17 and tightening the wing nuts onto the ears 18 until the measuring instrument has been firmly attached to the base ring.

With the measuring insrument thus assembled valve 56 may be opened to supply noncompressible liquid to the cylinder 3, which may flow through the connecting tube 30 down through the neck 20 of cover 15 into the inflatable bag 2. While such liquid might be a type of oil, water is satisfactory, but preferably a small amount of oil miscible with the water is used for purposes of lubricating the cylinder walls to facilitate sliding of the piston 4 in the cylinder. Such oil may be a sulphonated mineral oil, for example. Sufficient liquid should be supplied from the conduit 55 so as to fill a substantial portion of the cylinder, such as perhaps one-fifth of the cylinder, as well as filling the inflatable bag 2 distended to fill the casing. At this time no pressure is being exerted on the liquid by the piston 4.

When the desired amount of liquid has been admitted to the cylinder 3 from the source of liquid, valve 56 is closed to seal the liquid within the measuring instrument. The entire instrument may then be rocked and the piston moved downward by pressure on the piston rod 41 until all of the air in the bag 2, connecting tube 30 and portion of cylinder 3 below the piston 4 has been forced upward through the bore 44 and out through the grooves 47. It will be desirable to rock the instrument gently to aid any air trapped in the liquid to escape. Piston rod 41 is then screwed inward until either it or rod extension 42, as the case may be, is pressed against gasket 5 sufficiently tightly to close the grooves 47. By pulling upward on piston rod extension 41 liquid is then sucked through tube 24, 25, 26 and connecting tube 30 upward into cylinder 3 by upward movement of piston 4, until sufficient liquid has been removed from the bag so that it assumes about the shape shown in Figure 2. Valve 32 is then closed to sever the connection between the bag 2 and the cylinder 3.

Additional liquid is now supplied to the cylinder by opening valve 56 again until piston 4 is nearly at the top of the cylinder. Such filling of the cylinder may be facilitated by removing the cylinder head 52 and piston 4 during such filling of the cylinder with liquid. Particularly if the piston is not removed from the cylinder during this operation the plug 53 should be removed from cylinder head 52 to enable air to escape readily from the upper end of the cylinder. To afford the greatest accuracy of measurement, particularly if the instrument is being filled with liquid for the first time or has not been used for some time, after closing valve 56 valve 32 may be opened and the piston rod 41 pushed downward so that piston 4 will force liquid from the cylinder 3 into the inflatable bag 2. The piston 4 may be worked up and down in the cylinder several times in order to insure removal of all air from the bag even though it may be mixed with the liquid. With the piston in its upper position so that nearly all of the liquid has been removed from the bag 2, valve 32 is closed.

With the piston 4 near the top of cylinder 3, the piston rod section 41 or 42 is unscrewed from the piston rod extension 43 sufficiently to allow air to escape again from grooves 47. The piston and piston rod assembly is then lowered sufficiently so that the liquid rises from beneath the piston up through the bore 44 and grooves 47 to remove all air from cavities in communication with the portion of the cylinder below piston 4. Piston rod 41 is then re-tightened to close the air vent, and plug 53 may be replaced in cylinder head 52. All air should have been removed from the liquid-containing portions of the instrument by this operation so that it will then be ready for use.

The typical measuring operation of the instrument for measuring a calibrating cavity illustrated by Figures 4 to 11, inclusive, can be employed to determine the volume of a cavity to be dug in the ground surface between a calibration operation portrayed by Figures 4 to 7, inclusive, and the actual measuring operation exemplified by Figures 8 to 11, inclusive. The volume of the ground cavity thus found may be used in calculating the density of the earth removed in digging the cavity. To obtain the greatest accuracy, the volume of the index casing shown in Figures 4 to 7, inclusive, should be approximately the same as the volume of the ground cavity to be measured. Consequently, the number and size of the index rings incorporated in the index casing assembly will be selected with the approximate size of the cavity to be dug for measurement in mind.

Figure 5:
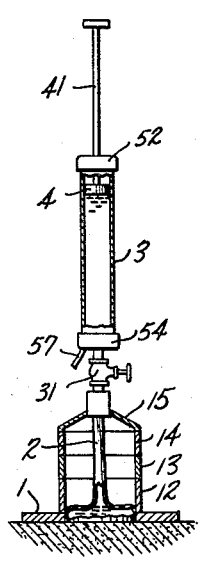

When index rings of the desired number and size have been stacked in interfitting relationship on the flat base ring, as shown in Figure 4, and this ring has been located on the ground over the pot to be excavated for forming the ground cavity to be measured, the cylinder assembly with the inflatable bag 2 and index casing cover 15 attached is lowered so that the bag descends inside the stack of rings. As the bag is lowered from the position shown in Figure 4 to that of Figure 5, without piston 3 being moved downward, the lower end of the bag engages the ground and then mushrooms out over the ground surface, as shown in Figure 5. While it is desirable for the base ring 1 to engage the ground reasonably flat and stably, any irregularity of the ground surface within the aperture 10 of the base ring is immaterial and does not affect the accuracy of the cavity volume measurement.

Figure 6:
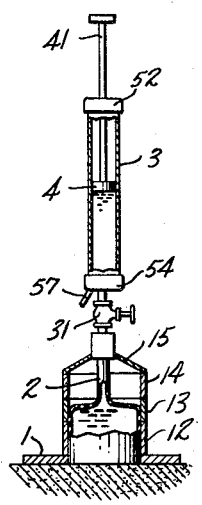
Figure 7:
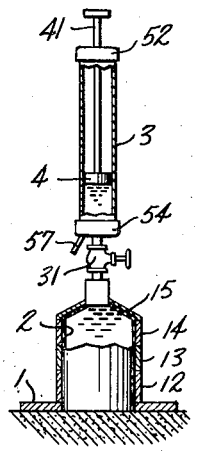

When the index casing cover 15 has been placed on the stack of rings in the manner shown in Figure 5, the tie rods 16 are swung into place and tightened as described previously to anchor the index casing cover and rings securely to the base 1 to form a unitary structure. The piston rod 41 will then be pushed downward manually as indicated in Figures 6 and 7 until the bag 2 has been distended to fill completely the index casing. It will be noted that the bag material is so limp that during such downward movement of the piston the bag 2 is distended from its bottom up, changing shape from its condition shown in Figure 5 to the condition of Figure 6 and finally to the condition of Figure 7. The index casing is thus filled from the bottom upward, so that as the bag membrane rolls progressively into contact with the walls of the index casing cavity all the air will be squeezed out of the casing ahead of the bag contact to be discharged through holes 19 in the cover 15.

When the bag 2 finally is distended to fill completely the index casing cavity as shown in Figure 7, the resistance to downward movement of the piston 4 in cylinder 3 will abruptly increase greatly. Upon such occurrence the reading of the graduations on piston rod 41 at the level of cylinder head 52 will be taken as the initial calibration reading of the instrument. When this reading has been recorded for future reference, the piston rod will be drawn upward again until most of the liquid has been sucked through tube 24, 25, 26 into the cylinder 3, as shown in Figure 5. Thereupon the valve 32 may be closed for convenience, and the wing nuts of the tie rods 16 may be released, so that the cylinder 3, cover 15 and bag 2 can be removed.

Depending upon the size of ground cavity to be excavated, one or more of rings 12, 13 and 14 may be removed from the base ring 1. The position of such base ring should, however, not be disturbed. The ground cavity to be measured can be excavated without disturbing the position of ring 1 by digging down through aperture 10. The dirt thus removed should be placed in an air-tight container, which should be sealed to prevent loss of moisture as soon as excavation of the cavity to be measured has been completed as shown in Figures 8, 9, 10 and 11. In this particular instance the size of the cavity is approximately the size of all the rings 12, 13 and 14 in combination.

Figure 8:
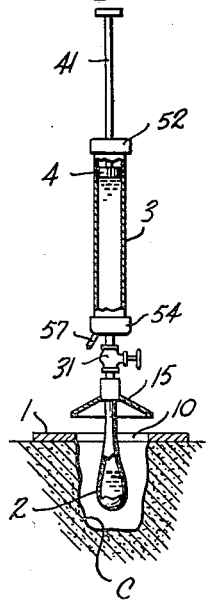
Figures 8, 9, 10 and 11 are diagrammatic side elevation views of the instrument with parts broken away, showing parts in various operative positions during a measuring operation.
Figure 9:
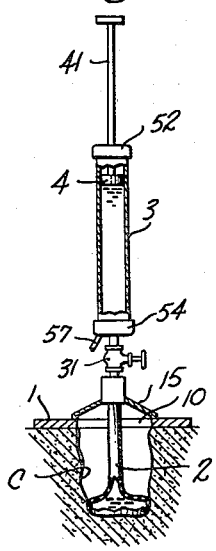
Figure 10:
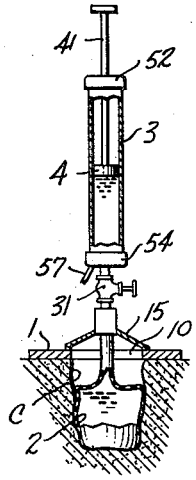
Figure 11:
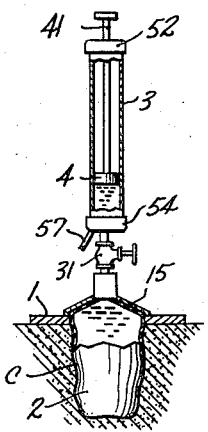

To measure the volume of the cavity C shown in Figures 8, 9, 10 and 11, the bag 2 suspended from the cover 15 is lowered into the cavity in the manner shown in Figure 8 until the periphery of the cover has seated in the aperture 10 of the base ring 1 in the manner shown in Figure 9. The tie rods 16 are then swung upward again into engagement with the notches 17 in ears 18, and the wing nuts are screwed down until the cover has been clamped securely to the base ring. Again the piston rod 41 is moved downward as illustrated in Figures 10 and 11 to inflate the bag 2. In this instance as the bag is inflated its membrane will roll from the bottom of the cavity as shown in Figure 9 upward along the sides of the cavity in the manner portrayed in Figure 10, squeezing out the air as such contact continues until the cavity and the cover 15 are completely filled by the distended bag.

When sufficient liquid has been forced from the cylinder 3 into the bag 2 so that the latter fills the cavity C and cover 15 completely, as shown in Figure 11, the resistance to downward movement of piston 4 again will abruptly increase because the liquid is substantially incompressible.

Again the reading of the graduations on piston rod 41 at the level of cylinder head 52 is taken, and such reading is directly related to the volume of the cavity because of the exactness with which the shape of the distended bag follows every irregularity of the cavity surface. Moreover, when the bag was distended in the condition shown in Figure 7, the calibration operation took into account the irregularity of the ground surface initially.

The piston rod 41 may be calibrated directly in cubic feet or fractions so that the volume of the cavity will be the known volume of each index ring minus the initial calibration reading, plus the cavity volume reading. In utilizing the index ring volume figures it has been found that some allowance must be made for the joint between adjacent index rings. Thus, for example, ring 14 may be 0.0500 cubic feet so that if this ring alone is used with the cover 15 in the initial formation of the index casing and later is removed in measuring the cavity, the index casing constant used will be 0.0500 cubic feet. If, however, both index rings 14 and 13 are used in forming the initial index casing, and it is desired that these rings be removed in measuring the cavity and the constant of the two rings is to be 0.1000 cubic feet, it will be necessary to make ring 13 by itself 0.0498 cubic feet. The joint between rings 13 and 14 accounts for the additional 0.0002 cubic feet.

While all the rings may be of approximately the same volume, more appropriate combinations can be made if the rings are not all of the same volume. Thus ring 12 may have a volume of 0.0998 cubic feet. In conjunction with only ring 14, therefore, ring 12 would enlarge the difference in index casing size effected by using such two rings to 0.1500 cubic feet, allowing for the volumetric effect of the joint between these rings in the amount of 0.0002 cubic feet. If a combination of rings 14, 13 and 12 is used, the change in volume of the index casing accomplished by such combination is 0.2000 cubic feet. Additional rings or rings of different sizes could be employed as may be desired to provide any index ring constant for use in comparing the measurement of the initial index casing and of the cavity the volume of which is to be measured. For best accuracy of the instrument it is desirable that the bag 2 be distended to approximately the same size during the index reading and the cavity volume reading, as has been mentioned, and that is why it is frequently desirable to provide a sectional ring type of index casing body.

Accuracy of measurement is also promoted by repeating several times the calibration operation and the volume measuring operation. Preferably the graduated piston rod section 41 is marked in increments not greater than 0.001 cubic feet, in which case positions of the rod may be interpolated to approximately 0.0002 cubic feet. Where the calibration operation and the measuring operation is repeated several times, the reading will be consistent within the variation of 0.0002 cubic feet. In order to obtain consistent readings it is, of course, necessary that the base plate 1 be held firmly down against the ground, and this may be accomplished while the readings are being taken, either by placing adequate weights on top of the ring or by two men standing on opposite sides of the ring.

In order to complete the determination of earth density in its condition prior to being disturbed, the earth removed from beneath the aperture 10 in plate 1 in digging the cavity is weighed, and such weight in pounds divided by the volume of the cavity in cubic feet will give the weight of the undisturbed earth in pounds per cubic foot.

I claim as my invention:

1. A cavity volume measuring instrument comprising a measuring liquid supply reservoir, a bag depending beneath and in communication with said reservoir for reception in a cavity the volume of which is to be measured, said bag being of such limp material as to be distended from its bottom up in intimate and contiguous contact with the bottom and wall of such cavity, rolling progressively from the bottom of such cavity up as said bag is distended to fill such cavity completely by liquid supplied to said bag from said reservoir, means over the cavity engageable by said bag and limiting the degree of upward distension thereof, and means indicating the quantity of liquid thus supplied to said bag from said reservoir when the upward distension of said bag is limited by said means.

2. A cavity volume measuring instrument comprising a measuring liquid supply reservoir, a bag depending beneath and in communication with said reservoir for reception in a cavity the volume of which is to be measured, conduit means extending from said liquid supply reservoir a substantial distance downward into said bag, said bag being of such limp material as to be distended from its bottom up in intimate and contiguous contact with the bottom and wall of such cavity, rolling progressively from the bottom of such cavity up as said bag is distended to fill such cavity completely by liquid supplied to said bag from said reservoir, means over the cavity engageable by said bag and limiting the degree of upward distension thereof, and means indicating the quantity of liquid thus supplied to said bag from said reservoir when the upward distension of said bag is limited by said means.

3. A cavity volume measuring instrument comprising a base having an aperture therethrough, a rigid cover mountable on said base in a position closing said base aperture and having a central aperture therein much smaller than said base aperture, a bag depending from the aperture in said cover and movable through the aperture of said base into a cavity therebeneath, a measuring liquid supply reservoir in communication with said bag supplying liquid thereto for distending it to fill such cavity completely in intimate contact with the walls of the cavity and the under side of said cover, and means indicating the quantity of liquid thus supplied to said bag from said reservoir.

4. A cavity volume measuring instrument comprising a casing including a base having a bottom aperture therein, a body ring of known volume settable on said base in a position encircling such aperture and a cover settable on the upper edge of said body ring, a liquid inflatable bag received within said casing, suspended from said cover and distendable into intimate engagement with the walls of said casing body ring on said base, and means operable to supply measuring liquid to said inflatable bag.

5. A cavity volume measuring instrument comprising a bag, a measuring liquid supply reservoir, means establishing communication between said bag and said measuring liquid supply reservoir including a flexible porous tube extending a substantial distance within said bag, and means operable to effect transfer of liquid from said reservoir into said bag from its bottom up for distending said bag and for withdrawing liquid from said bag through said flexible porous tube into said reservoir.

6. The cavity volume measuring instrument defined in claim 5, in which the flexible tube includes a wire frame and open mesh fabric encircling said wire frame.

7. The cavity volume measuring instrument defined in claim 6, in which the wire frame of the flexible tube is a wire helix.

8. A cavity volume measuring instrument comprising a liquid inflatable bag having a neck, a measuring liquid supply reservoir, means establishing communication between said liquid inflatable bag and said measuring liquid supply reservoir including a clamping tube received within the neck of said bag and having its exterior wall tapered toward the interior of said bag and a connecting tube connected to said liquid supply reservoir, having the interior surface of its end remote from said reservoir tapered toward said end complementally to the exterior taper of said clamping tube, and means operable to secure said clamping tube and said connecting tube in wedging engagement with the neck of said inflatable bag clamped therebetwen.

9. The cavity volume measuring instrument defined in claim 8, and a flexible porous tube carried by the clamping tube and extending a substantial distance within the bag.

10. A cavity volume measuring instrument comprising a casing including a base having a bottom aperture therein, a body ring of known volume settable on said base in a position encircling such aperture and a cover settable on the upper edge of said body ring, a liquid inflatable bag received within said casing, suspended from said cover and distendable into intimate engagement with the walls of said casing body ring when in place on said base, an upright liquid supply cylinder having its lower end connected to said inflatable bag, valve means operable to control flow of liquid from said cylinder into said bag, a piston reciprocable in said cylinder to effect transfer of liquid from said cylinder into said bag for inflating said bag, and a piston rod carried by said piston and projecting therefrom upward above the upper end of said cylinder, said piston rod being graduated to indicate by its movement the amount of liquid forced from said cylinder into said bag by movement of said piston.

11. The cavity volume measuring instrument defined in claim 10, and air vent means incorporated in the piston rod, closable by rotation of such piston rod.

12. A cavity volume measuring instrument comprising a liquid supply reservoir, a cover for a cavity the volume of which is to be measured, carried by and beneath said reservoir and having a neck defining a passage communicating with said reservoir and tapered donwwardly, a bag receivable in such a cavity, depending from said cover and having an open end fitted within said cover neck, and a downwardly tapered wedging tube received within said neck and clamping the open end of said bag to said neck.

References Cited in the file of this patent

UNITED STATES PATENTS

| | | |
|---|---|---|
| 1,188,649 | Hawthorne | June 27, 1916 |
| 1,750,872 | Bremer | Mar. 18, 1930 |
| 2,105,262 | Price | Jan. 11, 1938 |
| 2,270,505 | Burleson | Jan. 20, 1942 |
| 2,296,852 | Horner | Sept. 29, 1942 |
| 2,314,540 | Huntington | Mar. 23, 1943 |
| 2,472,620 | Rhodes et al. | June 7, 1949 |
| 2,606,442 | Raines | Aug. 12, 1952 |
| 2,667,782 | Shea | Feb. 2, 1954 |

FOREIGN PATENTS

| | | |
|---|---|---|
| 712,524 | Germany | Oct. 21, 1941 |